United States Patent
Schanz

[11] 3,893,547
[45] July 8, 1975

[54] BRAKE SHOE SUSPENSION
[75] Inventor: Johannes Hans Schanz, Mariannenweg, Germany
[73] Assignee: ITT Industries, Inc., New York, N.Y.
[22] Filed: Aug. 27, 1973
[21] Appl. No.: 391,927

[30] Foreign Application Priority Data
Sept. 30, 1972 Germany............................ 2248143

[52] U.S. Cl.............................. 188/73.5; 188/205 A
[51] Int. Cl.......................................... F16d 65/02
[58] Field of Search ....... 188/73.3, 73.5, 72.5, 72.4, 188/205 A, 73.6

[56] References Cited
UNITED STATES PATENTS
| | | | |
|---|---|---|---|
| 3,322,236 | 5/1967 | Burnett............................. | 188/73.5 |
| 3,628,636 | 12/1971 | Beller et al. ..................... | 188/205 A |
| 3,712,422 | 1/1973 | Haraikawa et al................ | 188/72.5 |

FOREIGN PATENTS OR APPLICATIONS
| | | | |
|---|---|---|---|
| 1,927,459 | 5/1970 | Germany .......................... | 188/73.5 |
| 1,357,517 | 5/1963 | France.............................. | 188/73.3 |

Primary Examiner—Trygve M. Blix
Assistant Examiner—Edward R. Kazenske
Attorney, Agent, or Firm—John T. O'Halloran; Menotti J. Lombardi, Jr.; Alfred C. Hill

[57] ABSTRACT

This relates to a brake shoe suspension for disc brakes. Brake shoes of disc brakes tend to rattle within their associated brake shoe shaft due to the necessary clearance between each of the brake shoes and the lateral guide surfaces of the associated brake shoe shaft. According to the present invention this disadvantage is avoided by providing a brake shoe suspension arrangement that will tilt each of the brake shoes at a slight angle relative to the top surface of the associated brake shoe shaft so that each of the brake shoes has a portion of at least one edge thereof in abutment with the associated one of lateral guide surfaces of the associated brake shoe shaft.

4 Claims, 3 Drawing Figures

BRAKE SHOE SUSPENSION

BACKGROUND OF THE INVENTION

This invention relates to a brake shoe suspension for disc brakes, and more particularly to brake shoes each having two holding holes through each of which a locking pin extends with clearance. The locking pins are secured to a caliper housing of the disc brake, and, thus, secures the brake shoes in a radial direction in a brake shoe shaft having lateral guiding surfaces. A springy element is provided which press the brake shoes radially towards the inside.

Brake shoe suspensions of the above mentioned type are widely used in present disc brakes and have been put into common use in disc brakes for motor vehicles. Such brake shoe suspensions have the disadvantage that due to the necessary clearance between the brake shoes and the lateral guiding surfaces of the brake shoe shafts — the brake shoes can move within the parallel clearance slot between the brake shoes and the lateral guiding surfaces of the brake shaft and, thus, the brake shoes cause rattling noises.

SUMMARY OF THE INVENTION

An object of the present invention is to provide a brake shoe suspension in which a rattling of the brake shoes in the brake shoe shafts is avoided with as little effort as possible.

A feature of the present invention is the provision of a brake shoe suspension arrangement for disc brakes comprising: a brake shoe shaft having a pair of spaced lateral guide surfaces; a brake shoe disposed in the brake shoe shaft between the lateral guide surfaces so that there is clearance between each edge of the brake shoe and the associated one of the lateral guide surfaces; a pair of spaced holding holes disposed through the brake shoe adjacent the top surface of the brake shoe shaft; a pair of locking pins each extending through a different one of the holding holes with clearance to secure the brake shoe in the brake shoe shaft; and a spring engaging the brake shoe between the holding holes to urge the brake shoe into the brake shoe shaft; the holding holes and the locking pins cooperating with each other to tilt the brake shoe relative to the lateral guide surfaces so that one portion of at least one edge of the brake shoe abuts the associated one of the lateral guide surfaces.

In a preferred embodiment of this invention each of the brake shoe receiving holes for the locking pins are on a different level with respect to the top surface of the brake shoe shaft.

The advantages of this invention are especially in the fact that without any extra efforts a rattling of the brake shoes is effectively avoided. The functioning capability of the brake is not influenced in any kind. Moreover this invention renders it possible that a greater clearance is possible between lateral guiding surfaces of the brake shoe shaft and the brake shoe and, thus, it is possible to produce the brake with smaller manufacturing tolerances than has been possible with brake shoe suspensions in the prior art, since with increasing clearance of the brake shoes in the brake shoe shafts the rattling of the disc brakes become stronger.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
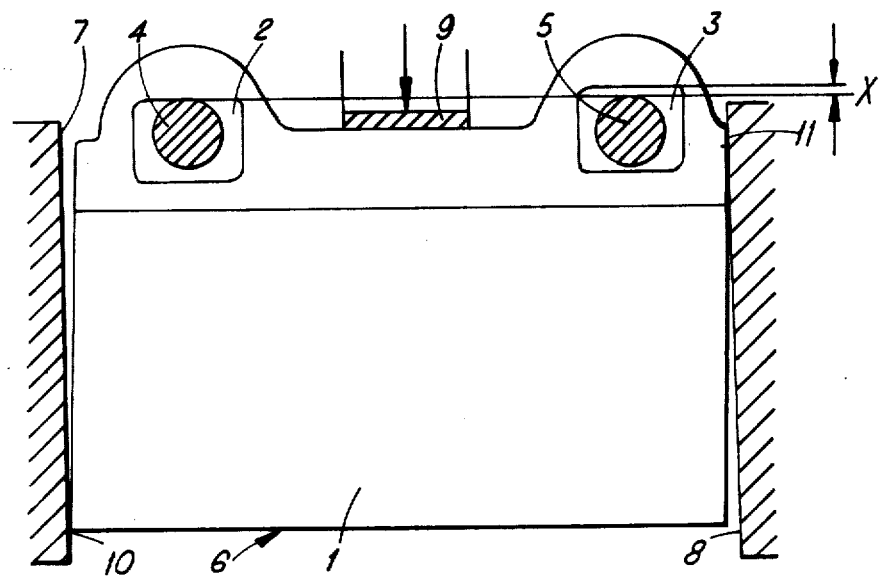
FIG. 1 is a plan view, partially in cross section of a preferred embodiment of the brake shoe suspension arrangement in accordance with the principles of the present invention.

FIG. 1 shows a brake shoe 1 having holding holes 2 and 3 for two locking pins 4 and 5. The brake shoe 1 is located in a brake shoe shaft 6 having lateral guide surfaces 7 and 8. Guide surfaces 7 or 8 have the brake torque, developed when braking, applied thereto dependent upon the driving direction of the vehicle.

As can be seen from FIG. 1 a considerable clearance is provided between locking pins 4 and 5 and holding holes 2 and 3. Above brake shoe 1 a spring 9 is arranged, which exerts a pressure upon the brake shoe 1, so that the brake shoe 1 is permanently pressed downwards (seen from the point of view of FIG. 1).

In order to prevent brake shoe 1 — when the brake is not used, or in certain brake situations — from hitting against lateral guide surfaces 7 and 8 and, thus, cause rattling noises, and two holding holes 2 and 3 are on two different levels, which are at right angles with locking pins 4 and 5, relative to the level of the top surface of the brake shoe shaft. The two different levels of holes 2 and 3 are separated by a small distance marked X. This distance X results in the brake shoe 1 is tilted around locking pin 4 due to spring 9. Thus, brake shoe 1 is tilted such that the lower portion 10 of the associated edge of brake shoe 1 comes into abutment against the associated lateral guide surface 7. For this purpose the level of holding hole 3 has to be separated from the level of holding hole 4 by a value of X such that the clearance between lateral guide surfaces 7 and 8 and brake shoe 1 can be overcome and the abutment against at least lateral guide surface 7 is guaranteed. It should be noted from FIG. 1 that the value of X is such that the upper portion 11 of the associated edge of brake shoe 1 comes into abutment against lateral guide surface 8.

Figure 2:
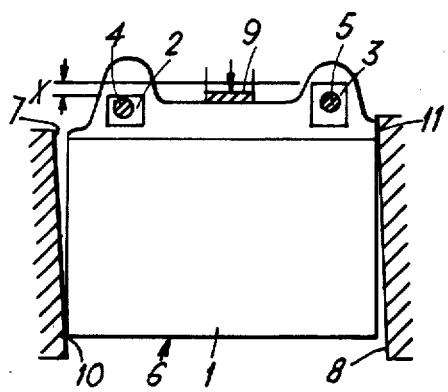
FIG. 2 is a plan view, partially in cross section, of a first alternative embodiment of the brake shoe suspension arrangement in accordance with the principles of the present invention.

The same effect can, of course, be obtained, when the level of holding hole 3 is not spaced from the level of holding hole 2, but rather the cross section of holding hole 3 is bigger than the cross section of holding hole 2. This is illustrated in FIG. 2.

Figure 3:
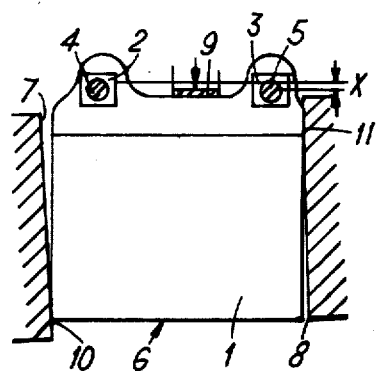
FIG. 3 is a plan view, partially in cross section, of a second alternative embodiment of the brake shoe suspension arrangement in accordance with the principles of the present invention.

Another possibility of achieving the desired tilting of brake shoe 1, so that at least one edge abuts against a lateral guide surface of the brake shoe shaft, is to have the two locking pins 4 and 5 on two different levels in the brake caliper with regard to the level of the top surface of brake shoe shaft 6. This is illustrated in FIG. 3.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake shoe suspension arrangement for disc brakes comprising:
    a brake shoe shaft having a pair of spaced lateral guide surfaces;
    a brake shoe having a pair of edges, each of said pair of edges being parallel to each other and adjacent an associated one of said lateral guide surfaces, said brake shoe being disposed in said brake shoe shaft between said lateral guide surfaces so that there is clearance between each of said pair of edges of said brake shoe and the associated one of said lateral guide surfaces;
    a pair of spaced holding holes disposed through said brake shoe adjacent the top surface of said brake shoe shaft;
    a pair of locking pins each extending through a different one of said holding holes with clearance to secure said brake shoe in said brake shaft; and
    a spring disposed parallel to said locking pins and engaging said brake shoe on an edge thereof having a perpendicular relation to said pair of edges between said holding holes; said spring exerting a vertical force on said brake shoe to urge said brake shoe radially inwardly;
    a clearance between the radial outer most surfaces of one of said holes and said pin being greater than a clearance between the radial outer most surfaces of the other of said holes and said pin;
    said holding holes, said spring, and said locking pins cooperating with each other to tilt said brake shoe relative to said lateral guide surfaces so that one portion of each of said pair of edges of said brake shoe abuts the associated one of said lateral guide surfaces.

2. An arrangement according to claim 1, wherein each of said holding holes have the same cross section and the center of each of said holding holes are on two different spaced levels parallel to the top surface of said brake shoe shaft.

3. An arrangement according to claim 1, wherein the center of each of said holding holes are ont he same level parallel to the top surface of said brake shoe shaft and one of said holding holes has a larger cross section than the other of said holding holes.

4. An arrangement according to claim 1, wherein each of said locking pins have the same cross section and the center of each of said locking pins are on two different spaced levels parallel to the top surface of said brake shoe shaft.

* * * * *